United States Patent
Bourland et al.

(10) Patent No.: US 11,343,642 B2
(45) Date of Patent: May 24, 2022

(54) METHOD FOR ESTIMATING THE HARMONIZATION VALUES OF A MAGNETOMETER INSTALLED IN A MOBILE MACHINE, ASSOCIATED DEVICE AND COMPUTER PROGRAM

(71) Applicant: Thales, Courbevoie (FR)

(72) Inventors: Jean-Claude Bourland, Valence (FR); Frédéric Sahliger, Valence (FR)

(73) Assignee: Thales, Courbevoie (FR)

( * ) Notice: Subject to any disclaimer, the term of this patent is extended or adjusted under 35 U.S.C. 154(b) by 41 days.

(21) Appl. No.: 16/822,758

(22) Filed: Mar. 18, 2020

(65) Prior Publication Data
US 2020/0304948 A1 Sep. 24, 2020

(30) Foreign Application Priority Data
Mar. 18, 2019 (FR) ...................................... 1902754

(51) Int. Cl.
| *H04W 4/02* | (2018.01) |
|---|---|
| *G01B 7/004* | (2006.01) |
| *G01B 7/30* | (2006.01) |
| *G06F 17/16* | (2006.01) |
| *G01C 25/00* | (2006.01) |

(Continued)

(52) U.S. Cl.
CPC ............ *H04W 4/026* (2013.01); *G01B 7/004* (2013.01); *G01B 7/30* (2013.01); *G01C 21/08* (2013.01); *G01C 25/005* (2013.01); *G06F 17/16* (2013.01); *G01C 17/38* (2013.01); *G01C 21/165* (2013.01); *G01C 21/20* (2013.01)

(58) Field of Classification Search
CPC ......... H04W 4/026; G01B 7/004; G01B 7/30; G06F 17/16; G01C 17/38; G01C 25/005; G01C 21/08; G01C 21/165; G01C 21/20
See application file for complete search history.

(56) References Cited

U.S. PATENT DOCUMENTS

| 4,539,760 A | 9/1985 | Marchent et al. |
|---|---|---|
| 5,321,631 A | 6/1994 | Germanetti |

(Continued)

FOREIGN PATENT DOCUMENTS

| EP | 0502771 A1 | 9/1992 |
|---|---|---|
| WO | 8800330 A1 | 1/1988 |

*Primary Examiner* — Roy Y Yi
*Assistant Examiner* — Geoffrey T Evans
(74) *Attorney, Agent, or Firm* — Thompson Coburn LLP; Steven M. Ritchey

(57) ABSTRACT

A method for estimating the harmonization values of a magnetometer installed in a mobile machine, said magnetometer being associated with its reference coordinate system XM, YM, ZM, said method, implemented by an electronic device, comprising acquiring magnetic field values measured by the magnetometer and determining the horizontal harmonization (hx, hy) by:
  estimating a first angle equal to the angle between XM and the large axis of an ellipse, defined in the plane comprising the two axes XM, ZM, by said acquired field values;
  determining hy as being equal to said first estimated angle,
  estimating a second angle equal to the angle between YM and the large axis of an ellipse defined, in the plane comprising the two axes $Y_M$, $Z_M$, by said acquired field vector values; and
  determining—hx as being equal to said second estimated angle.

8 Claims, 7 Drawing Sheets

(51) Int. Cl.
   *G01C 21/08* (2006.01)
   *G01C 21/20* (2006.01)
   *G01C 17/38* (2006.01)
   *G01C 21/16* (2006.01)

(56) References Cited

U.S. PATENT DOCUMENTS 7,930,148 B1 4/2011 Figaro et al.
2009/0254294 A1 10/2009 Dutta

METHOD FOR ESTIMATING THE HARMONIZATION VALUES OF A MAGNETOMETER INSTALLED IN A MOBILE MACHINE, ASSOCIATED DEVICE AND COMPUTER PROGRAM

CROSS-REFERENCE TO RELATED APPLICATIONS

This application claims priority to French Patent Application No. 1902754, filed Mar. 18, 2019, which is incorporated by reference herein in its entirety.

TECHNICAL FIELD OF THE INVENTION

The present invention relates to the field of determining the magnetic heading of a mobile machine from measurements of the Earth's magnetic field by a magnetometer installed in the mobile machine.

More specifically, the invention relates to a method for estimating the harmonization values of a magnetometer installed in a mobile machine, said magnetometer being associated with its reference coordinate system XM, YM, ZM and the mobile machine being associated with its aircraft coordinate system XA, YA, ZA, said method comprising a step for acquiring a plurality of magnetic field vector values measured by the magnetometer corresponding to successive positions of the mobile machine according to varied successive headings.

BACKGROUND OF THE INVENTION

In developing a magnetic heading, knowing the orientation, in a reference coordinate system, of the magnetometer as installed is necessarily geometric, otherwise the calculation of the magnetic is incorrect. Indeed, the calculation of the magnetic heading must be developed from the projection in a horizontal plane of the local geographic coordinate system of the magnetic field components measured in the magnetometric coordinate system.

The coordinate system of the magnetometer (more specifically, the trihedron of measurements from the magnetometric sensor), once installed, cannot be aligned with the reference coordinate system, which introduces angular errors into the calculation of the magnetic heading, the deterioration being added to the lack of runway horizontality in the case of measurement on the ground.

To determine these defects, called harmonization defects, there is a heavy measurement procedure by optical sighting on the mobile machine, which requires verifications in several steps during the manufacturing of segments in the case of an airplane. The first alternative is to constrain the installation precision of the support for the magnetometer on the structure of the aircraft (heavy constraint and not feasible in certain areas). The second alternative is to identify these harmonizations during a complete in-flight compensation (in-flight procedure constraint at this time with a predefined in-flight profile).

SUMMARY OF THE INVENTION

The aim of the invention is to propose a solution that allows a simple calculation, while significantly decreasing the time and complexity, of the horizontal harmonization angles.

To that end, according to a first aspect, the invention proposes a method for estimating harmonization values of a magnetometer installed in a mobile machine, of the aforementioned type, characterized in that it further comprises a step for determining the horizontal harmonization (hx, hy), where hx corresponds to the Euler angle associated with the rotation around XA, where hy corresponds to the Euler angle associated with the rotation around YA to go from the reference coordinate system XM, YM, ZM of the magnetometer to the airplane coordinate system XA, YA, ZA comprising the following steps:

estimating a first angle equal to the angle between XM and the large axis of an ellipse defined in the plane comprising the two axes XM, ZM by said acquired field values;

determining hy as being equal to said first estimated angle;

estimating a second angle equal to the angle between YM and the large axis of an ellipse defined in the plane comprising the two axes YM, ZM by said acquired field vector values;

determining —hx as being equal to said second estimated angle.

The invention thus makes it possible to estimate the harmonization on the ground, in particular during the phase for calculating the compensation of the magnetic flaws of hard irons and soft irons.

In embodiments, the method for estimating harmonization values of a magnetometer installed in a mobile machine according to the invention further includes one or more of the following features:

the estimate of the angle among the first or the second angle comprises the following steps:

determining the coordinates of the center of the ellipse by the half-sum, on the x-axis of the plane of the ellipse, the minimum x-axis and the maximum x-axis among the acquired field values and by the half-sum, on the y-axis of the plane of the ellipse, the minimum y-axis and the maximum y-axis among the acquired field vector values;

determining, in the plane of the ellipse, the point, among the acquired field vector values, at a maximum distance from the center of the ellipse;

calculating the angle as a function of said determined coordinates of the center of the ellipse and coordinates of said determined point at a maximum distance from the center;

the estimating method comprises the following steps:

calculating a difference between a reference heading value and a heading value resulting from a correction, as a function of the determined values of hx and hy, a measurement of the field done by the magnetometer corresponding to a position of the mobile machine according to said heading;

deducing the vertical harmonization value hz as a function of the equality below, as a function of the calculated difference and as a function of the determined values of hx and hy:

$$hz=[\delta\Psi - hy \cdot (\cos\theta \cdot \sin\varphi + \tan(I) \cdot (-\sin\theta \cdot \sin\varphi \cdot \cos\psi + \cos\varphi \cdot \sin\psi)) - hx \cdot (-\sin\theta - \tan I \cdot \cos\theta \cdot \cos\psi)] / (\cos\varphi \cdot \cos\theta - \tan(I) \cdot (\sin\theta \cdot \cos\varphi \cdot \cos\psi + \sin\varphi \cdot \sin\Psi)),$$

where:

I is the incline of the Earth's magnetic field in said position, $\psi$, $\theta$, $\varphi$ are the attitude angles, respectively yaw, pitch and roll, of the mobile machine in said position, and δΨ representing the heading calculation error due to the harmonization defects;
said equality yielding hz is approximated by one of the following formulas:

$$hz = \delta\Psi;$$

$$hz = \delta\Psi/(1-\tan(I)*\sin\theta);$$

$$hz = \delta\Psi/(\cos\varphi\cdot\cos\theta - \tan(I)\cdot(\sin\theta\cdot\cos\varphi\cdot\cos\psi\cdot\sin\varphi\cdot\sin\Psi)).$$

in a first phase, said harmonization values hx, hy, hz are determined as a function of magnetic field vector value measurements measured by the magnetometer while the mobile machine is on the ground, said following steps being implemented in a subsequent phase in order to specify the harmonization values, the mobile machine being in flight:
acquiring a plurality of magnetic field vector values measured by the magnetometer corresponding to successive positions of the mobile machine in flight according to varied successive headings;
approximating the harmonization matrix as specified in flight $[M_{harmosol}]\cdot[M_{harmovol}]$ by $[M_{harmosol}] + [M_{Harmovol}] - \text{Id})$, where Id is the Identity $$\text{matrix, } [M_{harmosol}] = \begin{bmatrix} 1 & hz & -hy \\ -hz & 1 & hx \\ hy & -hx & 1 \end{bmatrix} \text{ and}$$

$$[M_{harmovol}] = \begin{bmatrix} 1 & hzvol & -hyvol \\ -hzvol & 1 & hxvol \\ hyvol & -hxvol & 1 \end{bmatrix};$$

said harmonization values hxvol, hyvol, hzvol being determined based on a recursive algorithm, as a function of the magnetic field vector values acquired in flight, said recursive algorithm exploiting the fact that the vertical magnetic field components obtained after harmonization as a function of said approximation of $[M_{harmosol}]\cdot[M_{harmovol}]$ of the magnetic field vector values are equal to a constant.

According to a second aspect, the present invention proposes a computer program comprising software instructions which, when executed by a computer, carry out a method as defined above.

According to a third aspect, the present invention proposes an electronic device for estimating the harmonization values of a magnetometer installed in a mobile machine, said magnetometer being associated with its reference coordinate system XM, YM, ZM and the mobile machine being associated with its airplane coordinate system XA, YA, ZA, said device being configured to acquire a plurality of magnetic field vector values measured by the magnetometer corresponding to successive positions of the mobile machine according to varied successive headings;
said device being characterized in that it is configured, to determine the horizontal harmonization (hx, hy), where hx corresponds to the Euler angle associated with the rotation around XA, where hy corresponds to the Euler angle associated with the rotation around YA to go from the reference coordinate system XM, YM, ZM of the magnetometer to the airplane coordinate system XA, YA, ZA, to estimate a first angle equal to the angle between XM and the large axis of an ellipse defined in the plane comprising the two axes XM, ZM by said acquired field values, to determine hy as being equal to said first estimated angle, to estimate a second angle equal to the angle between YM and the large axis of an ellipse defined in the plane comprising the two axes YM, ZM by said acquired field vector values and to determine—hx as being equal to said second estimated angle.

BRIEF DESCRIPTION OF THE DRAWINGS

These features and advantages of the invention will appear upon reading the following description, provided solely as an example, and done in reference to the appended drawings.

DETAILED DESCRIPTION

Figure 1:
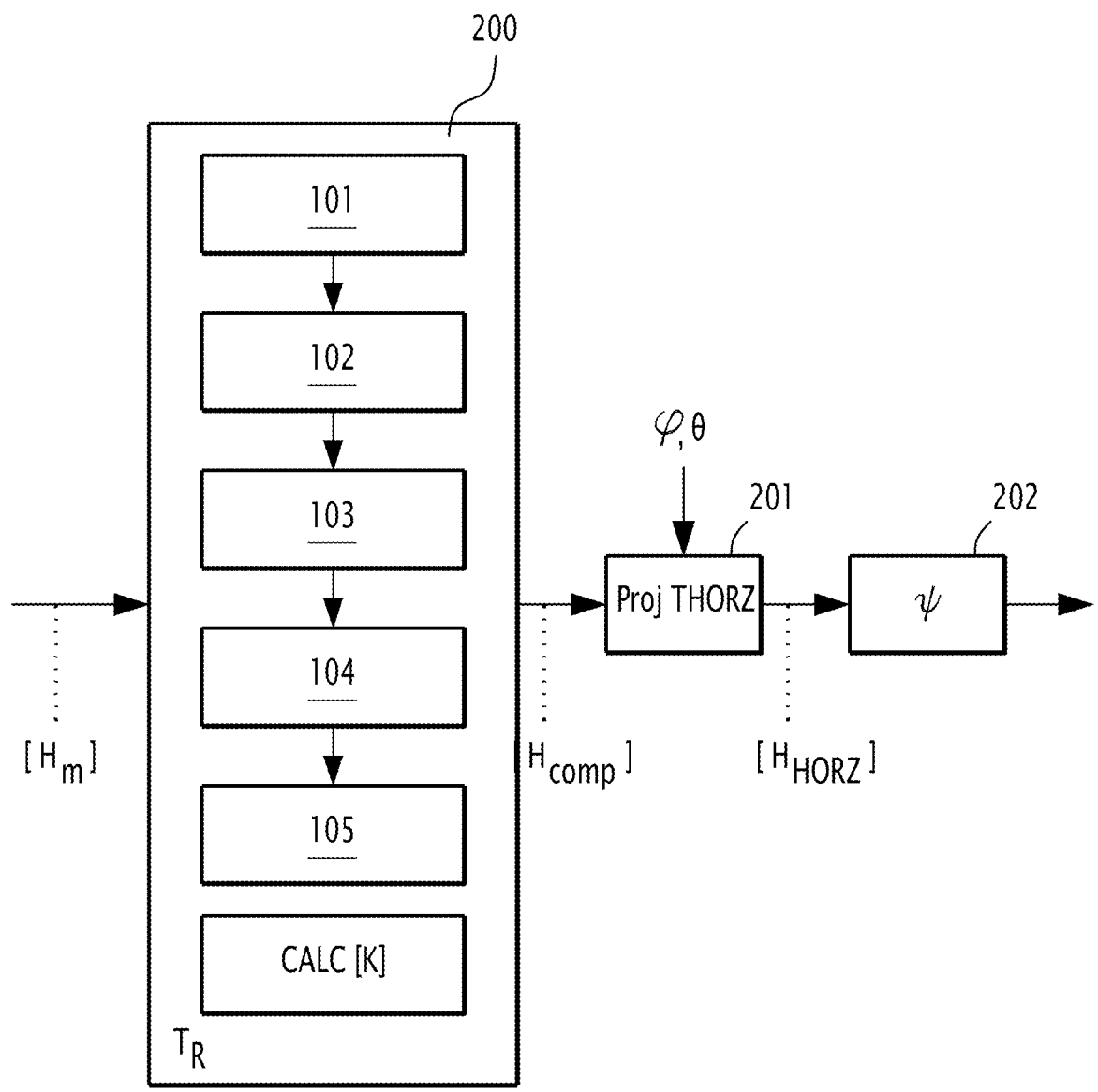
FIG. 1 shows an overview of operations carried out in one embodiment of the invention.

Hereinafter, let us consider an aircraft 10 shown in FIG. 2. In the considered embodiment, the aircraft 10 includes a heading determination system 1, shown in FIG. 3 and configured to determine a heading of the aircraft autonomously relative to the navigation unit determining the primary heading of the aircraft. It for example to that end comprises a secondary artificial Horizon instrument, also called "Stand-By attitude" (not shown).

The heading determination system 1 according to the invention comprises a magnetometer 2, an Inertial Measurement Unit 3, a processing unit 4 and a man-machine interface 4.

It makes it possible to facilitate a magnetic compensation procedure and, in an induced manner, to improve the quality of the compensation, and lastly to retrieve the estimated autonomous heading for the pilot.

The processing unit 4 is configured to acquire, as input and in real time, the magnetic field measurements delivered by the magnetometer 2.

The Inertial Measurement Unit 3, typically including three accelerometers and three gyrometers, determines the attitude angles of the aircraft 10 (in other embodiments, the attitude angles could be determined as a function of another more precise position and orientation determination device, for example a primary navigation unit, or a dual-antenna GPS heading, orientation supplied in real time at the input of the processing unit 4.

Figure 2:
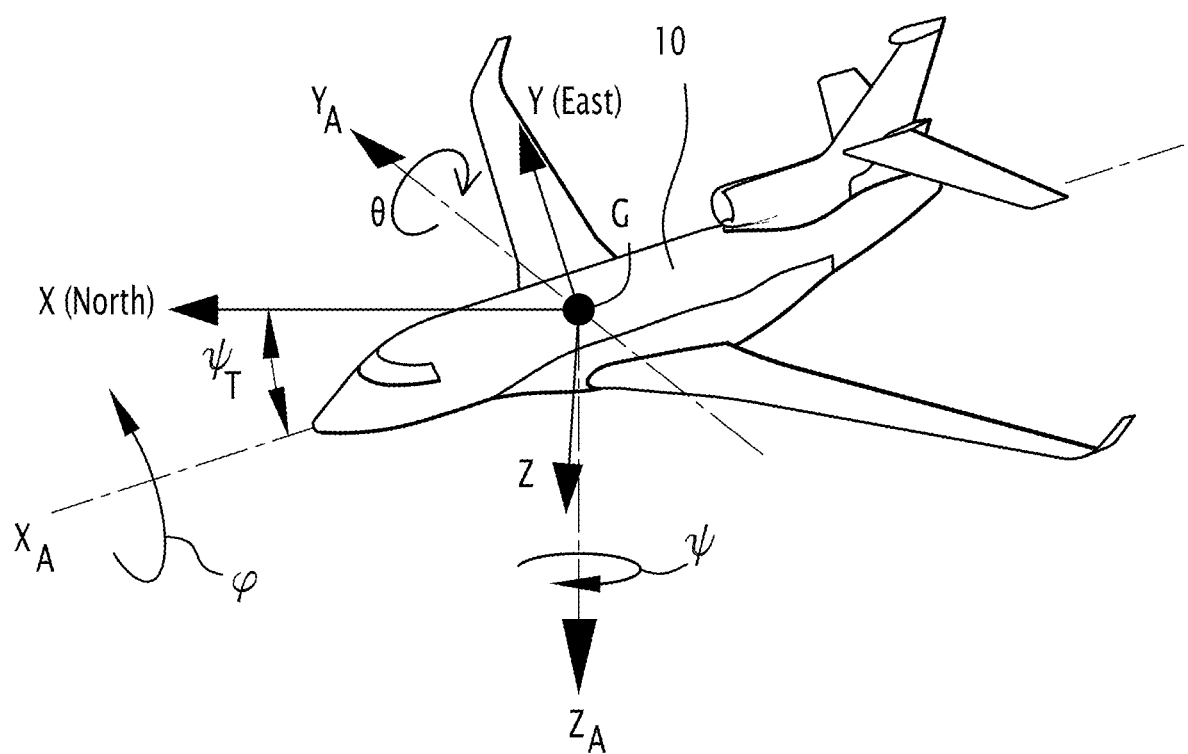
FIG. 2 is a view of an aircraft in one embodiment of the invention.
Figure 3:
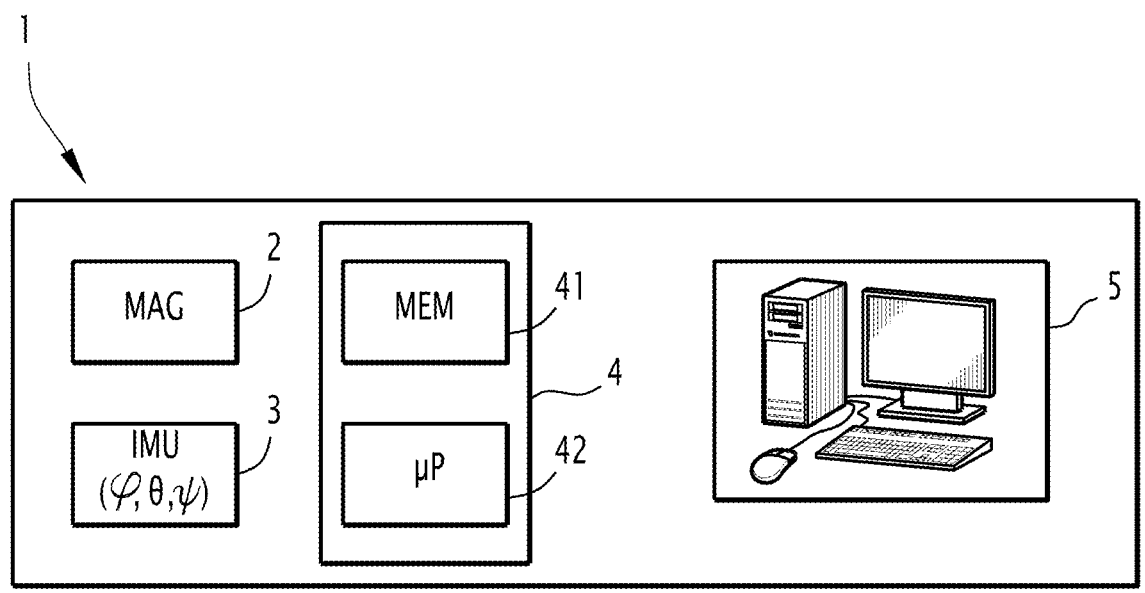
FIG. 3 schematically shows a heading determination system 1 in one embodiment of the invention.

Various coordinate systems are considered hereinafter:
the coordinate system specific to the magnetometer, here called TMAG, with origin $O_M$, with axes $X_M$, $Y_M$, $Z_M$ perpendicular to one another constituting a magnetometric measurement trihedron (or an assembly coordinate system of the magnetometer, and in this case coupled by a harmonization matrix specific to the magnetometer calibrated in the plant);
the Aircraft coordinate system, here called TA, with origin G being the point of reference of the airplane, for example its center of gravity or a mechanical point of reference of the structure, with axes $X_A$, $Y_A$, $Z_A$ perpendicular to one another typically where $X_A$ is the longitudinal axis oriented toward the nose of the aircraft (lubber line), $Y_A$ is parallel to the wings and oriented toward the right wing, $Z_A$ in turn being oriented downward in the increasing direction, as shown in FIG. 2;

the Local Geographical coordinate system, here called TGL (also called NorthEastDown), which is connected to the current point where the aircraft 10 is in altitude, that is to say, moving with the aircraft, with its origin being the point of the Earth's surface at the vertical of the center of gravity G of the aircraft, with axes X, Y, Z perpendicular to one another where the plane X, Y is a plane tangent to the Earth's surface, X pointing toward Geographical North (different from Magnetic North), Z pointing downward along the local vertical (cf. FIG. 2);

the Horizontal Aircraft coordinate system (in "horizontal flight"), here called THORZ, with origin G the reference point of the airplane, for example its center of gravity, with axes $X_{HORZ}$, $Y_{HORZ}$, $Z_{HORZ}$, deduced from the coordinate system TA after correcting the attitude of the airplane defined hereinafter, and therefore with $Z_{HORZ}$ parallel to Z of the TGL coordinate system.

The attitude angles of the aircraft are defined by three different Euler angles: $\psi$ (Yaw around $Z_A$ or geographical heading, $\theta$ (Pitch around $Y_A$) et $\varphi$ (Roll, around $X_A$) as shown in FIG. 2. The attitude of the aircraft vs a horizontal coordinate system THORZ is defined by the angles $\varphi$ and $\theta$. These Euler angles define the coordinate system change matrix, from the reference coordinate system TGL to the Airplane coordinate system at each instant; the angles $\varphi$ and $\psi$ are elements of $]-\pi, +\pi]$, $\theta$ is an element of $]-\pi/2, +\pi/2]$.

The attitude of the aircraft 10 is defined by the change from the TGL coordinate system to the TA coordinate system.

The matrix B ($\varphi$, $\theta$, $\psi$) of the direction cosine (aeronautical convention type II 3>2>1 angles of rotation Yaw $\psi$>Pitch $\theta$>Roll $\varphi$) is the following inverse matrix:

$$B(\varphi, \theta, \psi) = \begin{bmatrix} \cos(\psi)\cdot\cos(\theta) & -\sin(\psi)\cdot\cos(\varphi)+\cos(\psi)\cdot\sin(\theta)\cdot\sin(\varphi) & \sin(\psi)\cdot\sin(\varphi)+\cos(\psi)\cdot\sin(\theta)\cdot\cos(\varphi) \\ \sin(\psi)\cdot\cos(\theta) & \cos(\psi)\cdot\cos(\varphi)+\sin(\psi)\cdot\sin(\theta)\cdot\sin(\varphi) & -\cos(\psi)\cdot\sin(\varphi)+\sin(\psi)\cdot\sin(\theta)\cdot\cos(\varphi) \\ -\sin(\theta) & \cos(\theta)\cdot\sin(\varphi) & \cos(\theta)\cdot\cos(\varphi) \end{bmatrix}$$

The Inertial Measurement Unit does not make it possible to determine the Yaw angle $\psi$ and therefore the matrix B completely, hence the need to develop an autonomous gyromagnetic heading. The calculations are thus done in a horizontal coordinate system THORZ from roll $\varphi$ and pitch $\theta$ angles determined by the Inertial Measurement Unit.

The processing unit 4 is configured to perform the operations described below in reference to FIG. 1, in order to determine the value of the magnetic heading of the aircraft 10 in real time.

By definition, the magnetic heading yields an orientation relative to the Earth's magnetic North. It is determined in the horizontal plane of the location, that is to say, in $X_{HORZ}$, $Y_{HORZ}$.

The processing unit 4 is thus configured, in the considered example, to collect the magnetic field measurements done in the form of three-dimensional vectors called [$H_m$], to next perform a processing operation 200 so as to compensate for the measuring flaws and magnetic flaws in the measured field values and to deliver the magnetic field resulting from these processing operations in the form of three-dimensional vectors called [$H_{COMP}$], with components $HX_{COMP}$, $HY_{COMP}$, $HZ_{COMP}$.

The processing unit 4 is configured to perform a projection operation 201 of the vector [$H_{COMP}$] thus delivered in the corresponding horizontal coordinate system THORZ at the measurement instant, the vector resulting from this projection being called [$H_{HORZ}$], with components $HX_{HORZ}$, $HY_{HORZ}$, $HZ_{HORZ}$:

$$\begin{bmatrix} HX_{HORZ} \\ HY_{HORZ} \\ HZ_{HORZ} \end{bmatrix} = \begin{bmatrix} \cos\theta & \sin\theta\cdot\sin\varphi & \sin\theta\cdot\cos\varphi \\ 0 & \cos\varphi & -\sin\varphi \\ -\sin\theta & \cos\theta\cdot\sin\varphi & \cos\theta\cdot\cos\varphi \end{bmatrix} \cdot \begin{bmatrix} HX_{COMP} \\ HY_{COMP} \\ HZ_{COMP} \end{bmatrix}$$

Lastly, the processing unit 4 is configured to perform an operation 202 to determine the magnetic heading $\psi_{MAG}$ according to the following formula:

$$\psi_{MAG} = -\arctan\left(\frac{HX_{HORZ}}{HY_{HORZ}}\right)$$

The magnetic heading thus determined is next used for example as a reference typically for a gyromagnetic hybridization loop for display or as heading reference for an AHRS (Attitude and Heading Reference System) function, more broadly, with different levels of hybridization in embodiments.

The magnetic disruptors near the magnetometer can be modeled as follows:

hard irons related to the presence of magnetized ferromagnetic materials or electrical conductors passed through by established currents;

soft irons related to non-magnetized ferromagnetic materials that become field lines leading to an error as a function of the attitude of the aircraft;

fields re-induced in a dynamic attitude phase (created by eddy currents related to the temporal variations of magnetic fluxes in the metal structure of the aircraft).

This simplified model of magnetic disruptors is sufficient for limited angular speeds and for the targeted heading precision, without accounting for fields re-induced dynamically (created by eddy currents related to the temporal variations of magnetic fluxes in the metal structure of the aircraft).

The disrupted measured field in a magnetometer coordinate system TMAG is modeled as follows, as a function of the theoretical magnetic field of the considered location in the Earth's geographical coordinate system TGL and the attitude of the aircraft 10:

$$\vec{Hm} = [k]\cdot\vec{Ht} + \vec{b} \text{ ou } \vec{Ht} = [K]\cdot(\vec{HM} + \vec{B})$$

where $\vec{H_t}/\vec{H_m}$ are respectively the theoretical magnetic field expressed in coordinate system TA/the measured magnetic field expressed in coordinate system TMAG, "close" to TA (typically less than 30 mrad).

$\vec{b}$: hard iron disturbance parameters, [k]: soft iron parameters.

A general model of compensation for the magnetic field measured in TMAG is deduced therefrom:

$$\begin{bmatrix} Hmx \\ Hmy \\ Hmz \end{bmatrix} = \begin{bmatrix} kxx & kxy & kxz \\ kyx & kyy & kyz \\ kzx & kzy & kzz \end{bmatrix} \cdot \begin{bmatrix} Htx \\ Hty \\ Htz \end{bmatrix} + \begin{bmatrix} bx \\ by \\ bz \end{bmatrix}$$

$$\begin{bmatrix} Htx \\ Hty \\ Htz \end{bmatrix} = \begin{bmatrix} Kxx & Kxy & Kxz \\ Kyx & Kyy & Kyz \\ Kzx & Kzy & Kzz \end{bmatrix} \cdot \begin{bmatrix} Hmx + Bx \\ Hmy + By \\ Hmz + Bz \end{bmatrix}$$

With $$\vec{B} = \begin{bmatrix} B_x \\ B_y \\ B_z \end{bmatrix}$$

hard iron compensation vector and ($\vec{B} = -\vec{b}$) and $$[K] = \begin{bmatrix} K_{xx} & K_{xy} & K_{xz} \\ K_{yx} & K_{yy} & K_{yz} \\ K_{zx} & K_{zy} & K_{zz} \end{bmatrix}$$

soft iron compensating matrix ($[K]=[k]^{-1}$).

In the specific embodiment considered here, the compensation model used is intentionally reduced, defined by $\vec{B}=B_c$ and $[K]=K_c$, and used for a compensation done on the ground with the compensated field $H_c$ (close to $H_t$) $= K_c * H_m + B_c$. This is justified by the mathematical non-observability on the ground and therefore the very low quality estimate of certain "vertical" parameters that it is preferable to force to zero taking account of the physical order of magnitude of the non-diagonal "vertical" parameters.

Thus, in compensation on the ground, a 4th order identification is appropriate with $b_x$, $b_y$, $k_{xx}=1$, $k_{xy}=k_{yx}$, $k_{yy}$, and the following approximations $k_{xz}=k_{zx}=k_{yz}=k_{zy}=0$, $k_{zz}=1$, $b_z=0$.

$$K_c = \begin{bmatrix} Kcxx & Kcxy & 0 \\ Kcxy & Kcyy & 0 \\ 0 & 0 & 1 \end{bmatrix} \quad Hm = \begin{bmatrix} hmx \\ hmy \\ hmz \end{bmatrix} \quad Bc = \begin{bmatrix} Bcx \\ Bcy \\ 0 \end{bmatrix}$$

In approximation, the matrix of the soft irons is taken to be symmetrical $k_{xy}=k_{yx}$, $k_{yz}=k_{zy}$, $k_{xz}=k_{zx}$ (in relation with the deform of the field lines and the physics of a field potential in a neighborhood).

Figure 4:
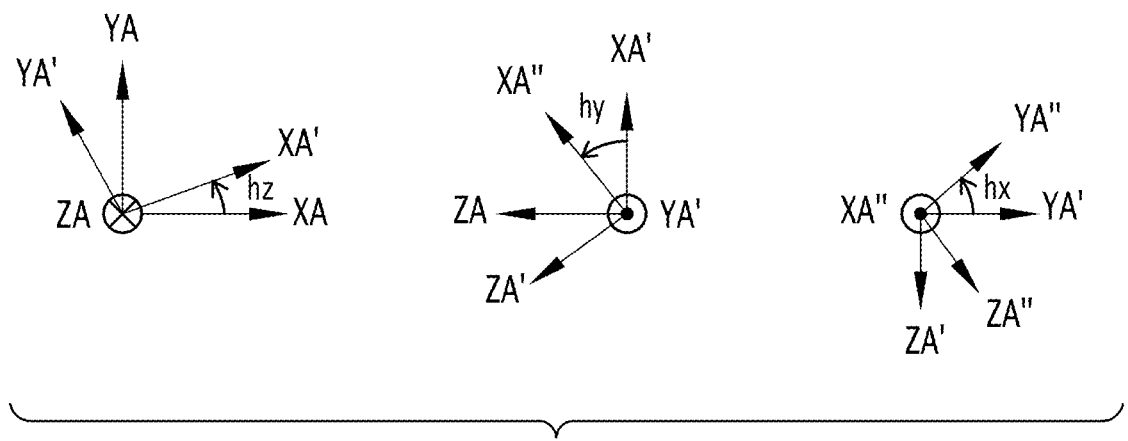
FIG. 4 is a view illustrating the harmonization angles between the coordinate system of the magnetometer 2 TMAG and the aircraft coordinate system TA.

As explained above, regarding the measuring flaws this time, it is appropriate to determine, then correct all three angles, called harmonization angles, yielding the orientation of the coordinate system of the magnetometer TMAG (that is to say, of the magnetometric measurement trihedron of the sensor), relative to the Aircraft coordinate system TA once the equipment is installed on the aircraft 10. It is therefore a matter of knowing the coordinate system change matrix, orthogonal matrix called rotation matrix and corresponding to the composition of the three elementary rotations of the three Euler angles in 3 dimensions. These three angles, hx, hy, hz corresponding to the imprecisions in the angular assembly of the magnetometer, are shown in FIG. 4, illustrating the passage from the coordinate system TA to the coordinate system TMAG via the elementary rotations by an angle with value hz (around the axis Z), then by an angle with value hy (around the axis Y), then by an angle with value hx (around the axis X) with the trihedrons thus transformed: respectively the trihedron [XA,YA,ZA] becomes the trihedron [XA',YA',ZA] after rotation by hz (around ZA), which becomes the trihedron [XA'',YA',ZA'] after rotation by hy around YA'which becomes the trihedron [XA'',YA'',ZA''] after rotation by hx around XA''. The angles hx (roll angle), hy (pitch angle) are the horizontal harmonization angles, while the angle hz is the yaw harmonization angle. These angles can be shown in the form of a so-called harmonization matrix $M_{Harmo}$.

Furthermore, having stated the following points:

(1) Expression of the theoretical magnetic field $\overrightarrow{H_{TAtheo}}$ in coordinate system TA from characteristics of the magnetic field $\overrightarrow{H_{GL}}$ in the coordinate system TGL (field with norm H0 and field incline I, the field incline being the angle described by the field with its horizontal component, which increases with the latitude on the Earth's globe)

$$\overrightarrow{H_{TA\,theo}} = B^t \cdot \overrightarrow{H_{GL}} \text{ with } \overrightarrow{H_{GL}} = \begin{bmatrix} H_N \\ H_E \\ H_V \end{bmatrix} = H_0 \cdot \begin{bmatrix} \cos(I) \\ 0 \\ \sin(I) \end{bmatrix}$$

(2) Projection of the theoretical magnetic field in Horizontal Aircraft coordinate system $\overrightarrow{H_{HORZtheo}} = B(\varphi, \theta, \psi=0) \cdot \overrightarrow{H_{TAtheo}}$ (3) Projection of the actual magnetic field in Horizontal coordinate system taking account of the harmonization errors of the magnetometer mounted on the Airplane, defined by the anti-symmetrical matrix $M_{harmo}$:

$$M_{harmo} = \begin{bmatrix} 1 & hz & -hy \\ -hz & 1 & hx \\ hy & -hx & 1 \end{bmatrix}$$

The error caused by the harmonizations on the field components is deduced therefrom:

$$\overrightarrow{\delta_{HORZ}} = \overrightarrow{H_{HORZreal}} - \overrightarrow{H_{HORZtheo}} = B(\varphi, \theta, \psi=0) \cdot (M_{harmo} - Id) \cdot B^t \cdot \overrightarrow{H_{GL}}$$

(4) Expression of the magnetic heading error induced by differential of the heading:

$$\Psi = -\mathrm{atan}\left(\frac{H_{HORZY}}{H_{HORZX}}\right) \Rightarrow \delta\Psi =$$

$$\left(\frac{d\psi}{dH_{HORZX}}\right) \cdot \delta H_{HORZX} + \left(\frac{d\psi}{dH_{HORZY}}\right) \cdot \delta H_{HORZY}$$

$$\text{Or } \delta\psi = -\frac{1}{H_0 \cdot \cos(I)} \cdot (\sin\psi \cdot \delta H_{HORZX} + \cos\psi \cdot \delta H_{HORZY})$$

(5) Or by injecting the error components $\delta H_{HORZX}$ and $\delta H_{HORZY}$ as a function of the harmonizations hx, hy, hz (cf. point 3 above):

$$\delta\Psi = hz \cdot (\cos\varphi \cdot \cos\theta - \tan(I) \cdot (\sin\theta \cdot \cos\varphi \cdot \cos\psi + \sin\varphi \cdot \sin\Psi)) + hy \cdot (\cos\theta \cdot \sin\varphi + \tan(I) \cdot (-\sin\theta \cdot \sin\varphi \cdot \cos\psi + \cos\varphi \cdot \sin\psi)) + hx \cdot (-\sin\theta - \tan(I) \cdot \cos\theta \cdot \cos\psi)$$

More specifically, in the case of the invention, the following points are demonstrated by the inventors in an analytical error development and validated in simulation to quantify the approximation and harmonization limits:

The harmonization hz can be considered a separable error on the heading calculation for an attitude close to the horizontal. This error remains separable to the first order after compensation on the ground (the fault hz comes into play in anti-symmetrical terms combined with the matrix for soft irons and leads, after compensation on the ground, to residual pseudo-hard irons not compensated in X and Y). This error related to hz is major and requires an estimate and correction on the ground. Additionally, in order to estimate hz on the ground with sufficient precision, hx/y must be fairly low within the limits set out later.

The harmonizations hx and by have a second order impact on the ground after compensation on the ground. Conversely, their impact becomes significant in flight during maneuvers, resulting in the importance of correcting hx/hy to improve the magnetic heading performances during flight.

It is shown analytically in the product of the soft irons matrix and the harmonization matrix, that the harmonization angles can be estimated to the first order for the framework set out above of approximations and harmonization limits. One bases oneself on the general properties of ellipsoids projected in 2D in ellipses along two planes: indeed, the field vector traces an ellipsoid for the points measured according to the magnetic flaw modeling hypothesis previously stated, the locally constant field norm calculation yielding the equation in 3D. Here, the specific idea is stated that the hx/hy harmonizations contribute, in projection in the respective planes [XZ]/[YZ], to the angle of the main axis of each of the two ellipses and that these harmonizations can be estimated in approximation to the first order via the angle of these two ellipses.

More specifically, in the case of the invention, in the processing unit 4 is [sic] configured to determine the values of the harmonization angles and to correct, in the magnetic field measurements measured by the magnetometer, the harmonization errors as a function of these values.

Figure 5:
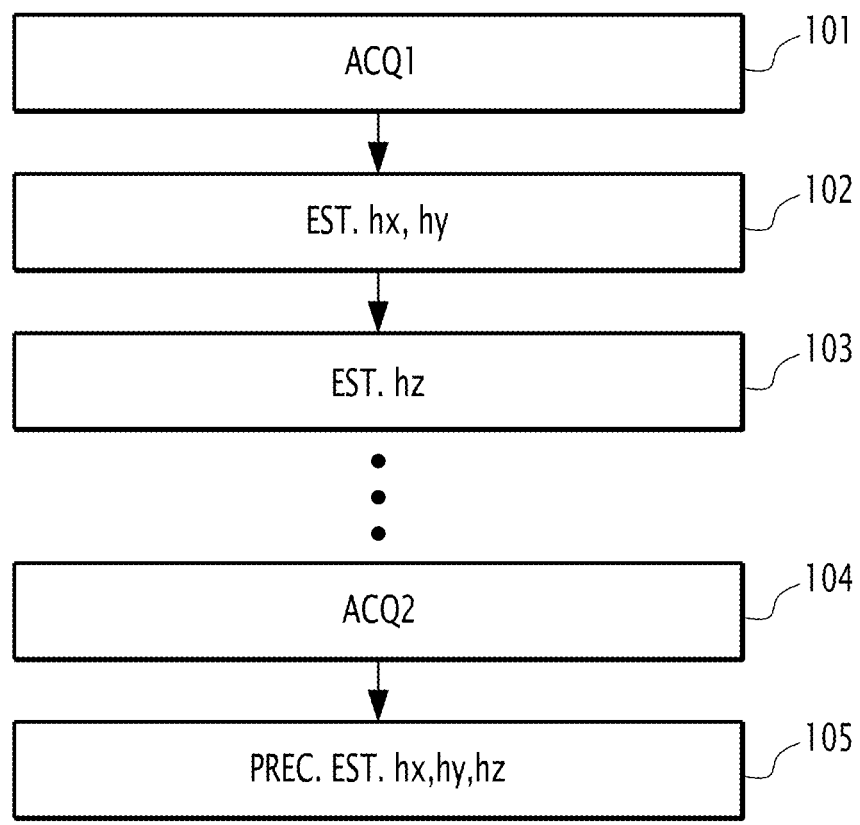
FIG. 5 is a flowchart of steps implemented in one embodiment of the invention.

Thus in one embodiment, the processing unit 4 includes a memory 41 and a microprocessor 42. The memory 41 includes software instructions which, when executed on the microprocessor 42, carry out the steps performed by the processing unit 4 and described in detail below in reference to FIG. 5.

In the considered embodiment, the steps 102 and 103 take place during the operation 200.

In a prior acquisition and preparation phase (ACQ1) 101, the magnetic field is measured by the magnetometer 2 all throughout a 360° heading revolution described by the aircraft on the ground from a reference heading if available, for example over a certified magnetic compensation area on the ground, which is a favorable place from a magnetic viewpoint. For example, the rotation on the ground is from 1°/s to 5°/s maximum. These magnetic field measurements (vectors in three dimensions, measured in the coordinate system of the magnetometer) are each registered in correspondence with the corresponding attitude of the aircraft 10 as issued by the Inertial Measurement Unit 3.

For example, a set of measurements is done with acquisition at 60 Hz over one revolution on the ground (rotation range greater than or equal to 360°): or in light of rotation between 1°/s and 5°/s, every 1 minute to 5 minutes of angle over a complete revolution.

Then, temporal filtering of the raw measured field components and a same filtering of the attitudes (adapted to the rotation context on the ground from 1°/s to 5°/s maximum) is done, for example with a low-pass filter FIR of the $2^{nd}$ order or a median filter over a centered temporal window (if applicable with a bandpass filter as a function of the noise characteristics of the magnetometer 2).

A coherence criterion is next applied with magnetic anomaly verification or disturbance verification broadly speaking, as well as a stability and horizontality criterion during the measuring phase (via Stand-By attitude or via an external attitude reference if available), to eliminate erroneous measurements.

The principle consists of incorporating the magnetic variations in the form of combined criteria on the field components, the field norm and on the magnetic incline. The observation benefits from horizontality and rotation speed measurements of the Stand-by attitude. Two temporal windows are applied during the procedure that are dimensioned for the aircraft dynamics and the gyrometric drift class. The temporal stability is evaluated on the measured signals by sliding average and root mean square (rms) on these two temporal horizons.

The filtering step and the criterion verification step are done according to the embodiments by the processing unit 4 or another processing module of the heading determination system 1.

The magnetic field values (that is to say, the values of the coordinates of the magnetic field vectors) measured by the magnetometer derived from the acquisition and preparation step and the associated attitude information are used by the processing unit 4 to evaluate K and $\vec{B}$, that is to say, the compensating model, for example reduced as mentioned above, using known compensating methods (for example:

EP0041982A1—Crouzet—1981—method for compensating for magnetic disturbances in the determination of a magnetic heading and devices for implementing such methods.

IEEE-AIAA Navigation conference—Gebre Egziabher—Elkaim G H—2001—A non-linear two steps estimation algorithm for calibrating strapdown magnetometer.

Figure 6:
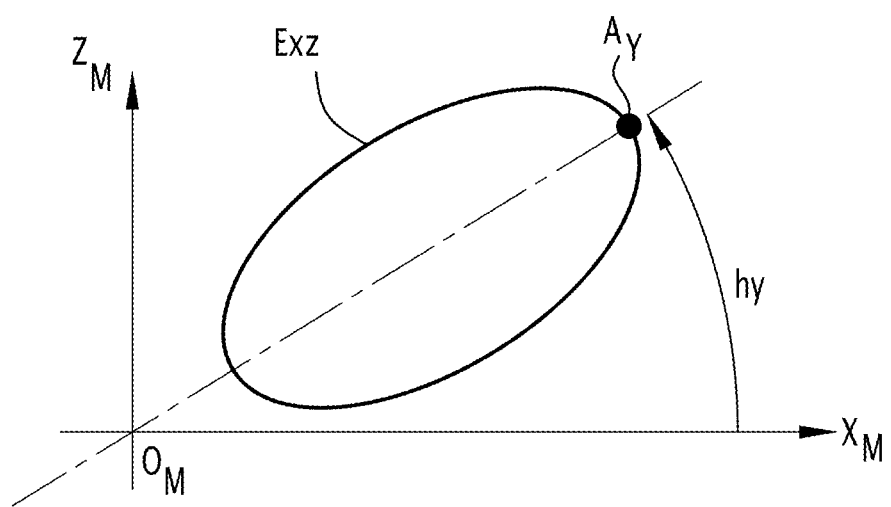
FIG. 6 is a view illustrating the calculation of the harmonization angle hy in one embodiment of the invention.
Figure 7:
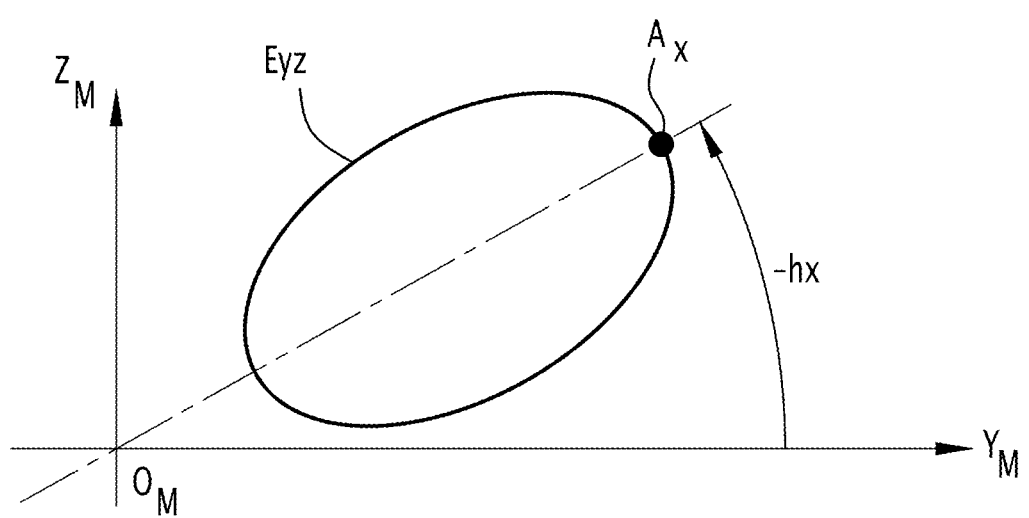
FIG. 7 is a view illustrating the calculation of the harmonization angle hx in one embodiment of the invention.

Article of Stanford University—D. Gebre Egziabher—G H Elkaim—J D Powels—2002—calibration of strapdown magnetometer in the magnetic field Next, in a step (EST hx, hy) 102, the processing unit 4 estimates the horizontal harmonization values hx, hy:

it determines the angle between the axis $Y_M$ and the large axis of the ellipse $E_{YZ}$ described in the plane $Y_M, Z_M$ by the magnetic field values measured by the magnetometer derived from the acquisition and preparation step 101, and assigns—hx the angle value thus determined (cf. FIG. 7);

it determines the angle between the axis $X_M$ and the large axis of the ellipse $E_{XZ}$ described in the plane $X_M, Z_M$ by the magnetic field values measured by the magnetometer derived from the acquisition and preparation step, and assigns hy the angle value thus determined (cf. FIG. 6).

This in one embodiment is implemented via an iterative algorithmic calculation of maximum/minimum components as a function of their sign-in order to identify the angle of each of the two ellipses projected in the magnetometric coordinate system in 2D. A characteristic point search of the ellipse makes it possible to estimate the center and a point at a greater distance from the center in order to calculate the arctangent. A verification of the second point of maximum distance is applied to the filtered measurements.

For example in the plane $[X_M Z_M]$, the angle of the ellipse $E_{xz}$ approximating hy, the following estimator is implemented by recursive calculation (NB: the angle of the projected ellipse [YZ] in reality approximates—Hx):

determination of the coordinates center_eIIX, center_eIIZ of the center of the ellipse by calculation of the maximum and minimum of the field components on the y-axis $Z_M$ and the x-axis $X_M$: $\max(Z_M)$, $\min(Z_M)$, $\max(X_M)$, $\min(X_M)$:

center_eIIZ=$(\max(Z_M)+\min(Z_M))/2$; center_eIIX=$(\max(X_M)+\min(X_M))/2$;

these coordinates make it possible to deduce the coordinates of the point of the ellipse at a maximum distance from the estimated center of the ellipse:

one calls $d\_center=((((X-center\_eIIX)\hat{\ }2)+((Z-center\_eIIZ)\hat{\ }2)))\hat{\ }0.5$;

one looks for the point, called (maxi_center) with coordinates (Xmaxi_center, Zmaxi_center) among the magnetic field values derived from step 101 (or obtained by interpolation of said values) and which is located at a maximum distance from the center:

maxi_center=point corresponding to max($d\_center$);

mini_center=point corresponding to min($d\_center$); verification (half large axis and half small axis), that is to say, determine the steering angle of the ellipse from coordinates of the point of the small axis and compare in keeping with the estimate from the coordinates of the point of the large axis.

Calculation of the ellipse steering angle, image of the desired harmonization parameter:

Angle $hy$=atan2((Zmaxi_center-center_eIIZ), (-Xmaxi_center+center_eIIX));

A similar recursive calculation is for example further carried out to determine hx, this time relative to the plane in the plane $[Y_M Z_M]$.

Then the processing unit 4 verifies the hypothesis of validity at the small angles (that is to say, hx and hy are less than 1.5°) and that the non-horizontality of the runway is less than 2°. If no, the angles are not valid. If yes, the determined values of hx and hy are considered to be validated.

Then in a step (EST hz) 103, the harmonization angle hz is now estimated, as follows:

sub-step 103_1: the harmonization value $M_{Harmo}$ is updated as a function of the values of hx, hy estimated in step 102 and by first assigning the value 0 to hz:

$$M_{harmo} = \begin{bmatrix} 1 & hz & -hy \\ -hz & 1 & hx \\ hy & -hx & 1 \end{bmatrix} = \begin{bmatrix} 1 & 0 & -hy \\ 0 & 1 & hx \\ hy & -hx & 1 \end{bmatrix},$$

sub-step 103_2: a heading error dip$\psi$ is calculated by obtaining the difference between a given heading value $Cap_{ref}$ (called reference) corresponding to one of the field measurement points of step 101 and the heading value determined as a function of the measurement of the magnetic field $\overrightarrow{H_{m\_ref}}$ when the aircraft was pointing toward the heading $Cap_{ref}$ corrected by the horizontal harmonization correction defined by $$\begin{bmatrix} 1 & 0 & -hy \\ 0 & 1 & hx \\ hy & -hx & 1 \end{bmatrix}$$

and if applicable the compensation correction, that is to say, d$\psi$ is calculated, using the formula:

$$d\psi = Cap_{ref} - M_{harmo}^{-1} \cdot K[\overrightarrow{H_{m\_ref}} + \vec{B}]$$

sub-step 103_3: the vertical harmonization value hz of this magnetic heading error value d$\psi$ thus calculated is deduced, from the values hx, hy determined in step 102, the attitude $\varphi$, $\theta$, $\psi$ of the corresponding aircraft at the measurement instant of the magnetic field $\overrightarrow{H_{m\_ref}}$, the incline I at the measurement point and the formula given in point 5 above written in the form:

$hz=[\delta\Psi-hy\cdot(\cos\theta\cdot\sin\varphi+\tan(I)\cdot(-\sin\theta\cdot\sin\varphi\cdot\cos\psi+\cos\varphi\cdot\sin\psi))-hx\cdot(-\sin\theta-\tan(I)\cdot\cos\theta\cdot\cos\psi)]/(\cos\varphi\cdot\cos\theta-\tan(I)\cdot(\sin\theta\cdot\cos\varphi\cdot\cos\psi+\sin\varphi\cdot\sin\Psi))$, (equation 1)

The harmonization matrix is updated using this value hz to continue calculations of the compensated field values $H_{comp}$ from measured fields $H_m$ subsequently used to calculate the heading, in particular based on magnetic field measurements $H_m$ done during the flight of the aircraft, using the formula $H_{comp} = M_{harmo}^{-1} \cdot K[\overrightarrow{H_m} + \vec{B}]$.

In one embodiment, in step 103_3, one of the following equations is used in place of equation 1, to determine hz:

$hz = \delta\Psi;$ $hz = \delta\Psi/(1-\tan(I)*\sin\theta);$ $hz = \delta\Psi/(\cos\varphi\cdot\cos\theta-\tan(I)\cdot(\sin\theta\cdot\cos\varphi\cdot\cos\psi+\sin\varphi\cdot\sin\Psi));$ the first two equations in particular in the case of angles hz limited to 1.5 deg and runway horizontality errors less than 2 deg.

In one embodiment, step 103_3 is reiterated considering two reference headings $Cap_{ref}$: heading at 0° (i.e. to the North) and at 90° (i.e. to the East) (or from any two directions spaced apart by 90°); the values of hz are calculated for each of these values, then compared. Only if they are indeed equal, the corresponding value of hz is retained and the harmonization matrix $M_{harmo}$ is updated using this value to continue compensated field calculations later used to calculate the heading, in particular during the flight of the aircraft.

The present invention therefore makes it possible to obtain harmonization values simply, on the ground.

This next makes it possible, from the beginning of the flight of the aircraft, to calculate more accurate magnetic heading values from magnetic field values coming from measurements done by the embedded magnetometer, from field values corrected for harmonization flaws.

In one embodiment, once steps 101 to 103 are done on the ground, the processing unit 4 performs, during the flight of the aircraft 10, a step for reinforcing the evaluation of the harmonization.

Thus in an in-flight acquisition phase (ACQ2) 104, the magnetic field is measured by the magnetometer 2.

Additionally, more precise harmonization values are determined in a step 105 (PREC EST), as described in detail below.

The harmonization calculation proposed below is mathematically based on the separability of the harmonization matrix into a sum (as small angles) of an estimated harmonization matrix on the ground and a complementary matrix estimated in flight: approximation of $[M_{harmosol}] \cdot [M_{harmovol}]$ by $[M_{harmosol}][M_{Harmovol}]-Id)$, with the matrix $$[M_{harmosol}] = \begin{bmatrix} 1 & hzsol & -hysol \\ -hzsol & 1 & hxsol \\ hysol & -hxsol & 1 \end{bmatrix},$$

the values hxsol, hysol, hzsol respectively being the values hx, by and hz calculated in steps 102 and 103.

$$[M_{harmovol}] = \begin{bmatrix} 1 & hzvol & -hyvol \\ -hzvol & 1 & hxvol \\ hyvol & -hxvol & 1 \end{bmatrix},$$

The estimator is produced by a recursive algorithm minimizing an error function, for example a recursive least-squares algorithm, from field measurements (three components Hmx/Hmy/Hmz) obtained by the magnetometer 2 in flight, filtered, and the altitude of the aircraft 10 as provided by the Inertial Measurement Unit 3 for each of these measurements with application of the same filtering characteristics as on the magnetometric measurements. According to the state of the art, a least-squares solves a series of linear equations in matrix form; indeed, having posited the following elements:
  observation built from measurement vector functions on several acquisitions (Y)=state matrix built from functions of the measurement vectors on several acquisitions [Xm]*a (sought unknown parameters);
  the best estimator â of a within the meaning of quadratic error is:

$$â=[Xm^t*Xm]^{-1}*Xm^t*Y$$

Upon each iteration, calculated a gain $K_G$ and a covariance matrix P without matrix inversion; thus in iteration n $$â(n)=â(n-1)+K_G(n)*(Y(n)-X(n)^t*â(n-1))$$

$$P(n)=P(n-1)-K_G(n)*X(n)^t*P(n-1)$$

$$K_G(n)=P(n-1)*X(n)*[1+X(n)^t*P(n-1)*X(n)]^{-1}$$

with $[1+X)(n)^t*P(n-1)*X(n))]^{-1}$ scalar.

The convergence of the estimator toward a solution â is detected when the quadratic error or the covariance are small enough (close to zero) with the possibility of stopping the iterations on new acquisitions.

In one specific embodiment, the estimator presented here for example consists of identifying the vertical component of the constant magnetic field in the coordinate system TGL. This component is obtained by projection of the field components measured in the coordinate system TMAG, compensated for the irons and harmonization model previously identified on the ground, while adding, for the flight compensation model, three additional unknown parameters to be identified in flight: flight harmonizations hxvol/hyvol/hzvol (corresponding to Mharmovol).

In this embodiment, the observability is favorable to the estimate of hxvol/hyvol, hzvol remaining a flaw separable to the first order as shown in the present invention, easily observable once the attitude of the aircraft varies, for example during a first turn in flight.

$Hvert=-\sin \theta \cdot Hxn_{compensvol}+\sin \varphi \cdot \cos \varphi \cdot Hyn_{compensvol}+\cos \theta \cdot \cos \varphi \cdot Hzn_{compensvol}$ where $H_{vert}$ is the vertical component of the magnetic field $Hvert$=unknown constant (equation 2)

$Hxn_{compensol}/Hyn_{compensol}/Hzn_{compensol}$ are the components x/y/z measured by the magnetometer, at the sampling instant n.Te (Te sampling period) compensated by the model of irons and harmonizations previously identified on the ground.

$Hn$ compensol$=Ksol \cdot [\vec{H_n}+\vec{B}]$ and $Ksol=M_{harmosol}^{-1} \cdot K$ with $$\vec{H_n} = \begin{bmatrix} Hxn \\ Hyn \\ Hzn \end{bmatrix} \text{ and } \overrightarrow{H_{n\,compensol}} = \begin{bmatrix} Hxn\,compensol \\ Hyn\,compensol \\ Hzn\,compensol \end{bmatrix}$$

The flight compensation model adds the unknown harmonization parameters as follows: $\overrightarrow{H_{ncompenvol}}=M_{harmovol}^{-1} \cdot \overrightarrow{H_{ncompensol}}$ The Least Squares is built in this particular embodiment by expressing equation 2 in matrix form with n rows corresponding to the n sampled measurements supplying the Least Squares:

$$\text{Observation } Y = \begin{bmatrix} Hve(1) \\ \vdots \\ Hve(n) \end{bmatrix}$$

with $Hve(i)=-(-\sin \theta \cdot Hxn_{compensol}+\sin \varphi \cdot \cos \varphi.Hyn_{compensol}+\cos \theta \cdot \cos \varphi \cdot Hzn_{compensol})$, i=1 at n, Hve(i) being the vertical field component measured at the sampling instant in flight, iTe corrected by the harmonization values obtained on the ground in steps 102, 103.

$$\text{State matrix } [Xm] = \begin{bmatrix} e1(1) & e2(1) & e3(1) & -1 \\ \vdots & \vdots & \vdots & \vdots \\ e1(n) & e2(n) & e3(n) & -1 \end{bmatrix}$$

with $e1(n)=-\sin \theta \cdot Hyn_{compensol}-\sin \varphi \cdot \cos \theta \cdot Hzn_{compensol})$ with $e2(n)=-\sin \theta \cdot Hzn_{compensol}+\cos \theta \cdot \cos \varphi \cdot Hxn_{compensol})$ with $e3(n)=-\cos \theta \cdot \cos \varphi \cdot Hyn_{compensol}-\cos \theta \cdot \sin \varphi \cdot Hzn_{compensol})$ $$\text{Unknowns vector } a = \begin{bmatrix} hzvol \\ hyvol \\ hxvol \\ Hvert \end{bmatrix}$$

and as indicated above, the best estimator â of a within the meaning of quadratic error is:

$$â=[Xm^t*Xm]^{-1}*Xm^t*Y.$$

Thus:
the estimate reinforcement consists of adding three complementary harmonization unknowns, in addition to the harmonizations derived from the ground correction (it is not a matter of an initialization of the harmonization parameters like in the existing methods), the final harmonization matrix Mharmo being the sum of Mharmosol and Mharmovol–Id).

one selective observability criterion can be applied per axis according to the current attitude and the attitude deviation integrated into the time for example for a vertical axis in the coordinate system TGL with identification of the vertical field component).

the estimator described here has the particularity of using all three measured magnetic field components (less sensitive to noise relative to the existing methods using the field norm, or even with a single component like the vertical component); the constancy of each component is thus observed selectively as a function of observability criteria cited above after de-projection using the current attitude of the aircraft (here, constancy corresponding to nil temporal differential).

In another embodiment, the processing unit 4 is made in the form of a programmable logic component, such as an FPGA (Field Programmable Gate Array), or in the form of a dedicated integrated circuit, such as an ASIC (Application Specific Integrated Circuit).

The invention allows an estimate on the ground of the horizontal harmonizations hx, hy by analysis of the geometric shape of the magnetic field measured in the planes [$Y_M$, $Z_M$] and [$X_M$, $Z_M$], to correct, on the ground, part of the major harmonization flaws (for hx, hy<1.5 deg and Hz<4 deg), with a horizontal harmonization precision of 0.5°, in light of low soft iron flaws on aircraft (for example, non-diagonal soft irons in the order of 3 mrad, acceptable over a range of 20 mrad for non-diagonal soft irons and of 20% for diagonal soft irons).

This compensating method on the ground considerably improves the precision of the heading, in particular in the case of a Stand-By attitude that would incorporate an autonomous heading function, with an in-flight heading precision gain in the order of 1° compared with the overall budget of 4° in quadratic errors (cf. § 2.4).

The inventors have demonstrated and validated, in a mathematical error development, that the harmonization hz can be considered a separable error on the heading calculation for an attitude close to the horizontal and that this error remains separable to the first order after compensation. The error hz is major and therefore requires an estimate and a correction on the ground.

The correction principle of the horizontal harmonizations of the magnetometer in particular does not require:
measuring harmonizations by inclinometers incorporated into the magnetometer,
measuring harmonizations by sighting or external means, generating a field, or external field value readings,
attitude movement during the execution of a 360° heading revolution on the ground on the runway,
any procedure by field measurements for several magnetometer attitudes obtained via an adjustable support.

The present invention describes the taking into account of a harmonization matrix in order to compensate the installation flaws of the magnetometer (small imprecision angles, with absolute value of less than 30 mrad (1.71 degrees)). In one embodiment, also taken into account is a harmonization matrix of the magnetometer in order to account for different assembly possibilities of the magnetometer in the structure; for example, coordinate system change matrix corresponding to the turnaround of the axis ZM by 180° relative to ZA, idem or for I of the axes YM and XM relative to YA and XA, or for example with a "large angles" coordinate system change matrix for notable angles on the order of 20 to 90 deg of elementary rotation relative to Z/Y/X.

The present invention has been disclosed above relative to an aircraft. It is applicable to any type of mobile machine, for example of the submarine, land, marine, etc. type.

The invention claimed is:

1. A method for estimating harmonization values of a magnetometer installed in a mobile machine, said magnetometer being associated with its reference coordinate system XM, YM, ZM and the mobile machine being associated with its airplane coordinate system XA, YA, ZA, said method, implemented by an electronic device, comprising a step for acquiring a plurality of magnetic field vector values measured by the magnetometer corresponding to successive positions of the mobile machine according to varied successive headings of the mobile machine on ground, a non-horizontality of the ground being less than 2°;

said method further comprising a step for determining horizontal harmonization values hx, hy, where hx corresponds to the Euler angle associated with rotation around XA, and where hy corresponds to the Euler angle associated with rotation around YA to go from the reference coordinate system XM, YM, ZM of the magnetometer to the airplane coordinate system XA, YA, ZA comprising the following steps:
estimating a first angle equal to an angle between XM and the large axis of an ellipse defined in the plane comprising the two axes XM, ZM by said acquired field vector values;
determining hy as being equal to said first estimated angle;
estimating a second angle equal to an angle between YM and the large axis of an ellipse defined in the plane comprising the two axes YM, ZM by said acquired field vector values; and
determining hx as being equal to said second estimated angle, wherein
the estimate of an angle among the first or the second angle comprises the following steps:
determining the coordinates of the center of the ellipse of the first or the second angle by the half-sum, on the x-axis of the plane of the ellipse of the first or the second angle, the minimum x-axis and the maximum x-axis among the acquired field vector values and by the half-sum, on the y-axis of the plane of the ellipse of the first or the second angle, the minimum y-axis and the maximum y-axis among the acquired field vector values;
determining, in the plane of the ellipse of the first or the second angle, the point, among the acquired field vector values, at a maximum distance from the center of the ellipse of the first or the second angle; and
calculating the angle among the first or the second angle as a function of said determined coordinates of the center of the ellipse of the first or the second angle and coordinates of said determined point at a maximum distance from the center.

2. The method for estimating harmonization values of a magnetometer installed in a mobile machine according to claim 1, comprising the following steps:
  calculating a difference between a reference heading value and a heading value resulting from a correction as a function of the determined values of hx and hy, a measurement of the magnetic field done by the magnetometer corresponding to a position of the mobile machine according to a heading of the mobile machine;
  deducing vertical harmonization value hz as a function of the equality below, as a function of the calculated difference and as a function of the determined values of hx and hy:

$hz=[\delta\Psi-hy\cdot(\cos\theta\cdot\sin\varphi+\tan(I)\cdot(-\sin\theta\cdot\sin\varphi\cdot\cos\psi+\cos\varphi\cdot\sin\psi))-hx\cdot(-\sin\theta-\tan(I)\cdot\cos\theta\cdot\cos\psi)]/(\cos\varphi\cdot\cos\theta-\tan(I)\cdot(\sin\theta\cdot\cos\varphi\cdot\cos\psi+\sin\varphi\cdot\sin\Psi))$, where:
    I is the incline of the Earth's magnetic field in said position;
    $\psi$, $\theta$, $\varphi$ are the attitude angles, respectively yaw, pitch and roll, of the mobile machine in said position; and
    $\delta\Psi$ represents heading calculation error due to harmonization defects.

3. The method for estimating harmonization values of a magnetometer installed in a mobile machine according to claim 2, according to which said equality yielding hz is approximated by one of the following formulas:

$hz=\delta\Psi$;

$hz=\delta\Psi/(1-\tan(I)*\sin\theta)$;

$hz=\delta\Psi/(\cos\varphi\cdot\cos\theta-\tan(I)\cdot(\sin\theta\cdot\cos\varphi\cdot\cos\psi+\sin\varphi\cdot\sin\Psi))$.

4. The method for estimating harmonization values of a magnetometer installed in a mobile machine according to claim 2, according to which, in a first phase, said harmonization values hx, hy, hz are determined as a function of magnetic field vector value measurements measured by the magnetometer while the mobile machine is on the ground, said following steps being implemented in a subsequent phase in order to specify the harmonization values, the mobile machine being in flight:
  acquiring a plurality of magnetic field vector values measured by the magnetometer corresponding to successive positions of the mobile machine in flight according to varied successive headings;
  approximating a harmonization matrix as specified in flight $[M_{harmosol}]\cdot[M_{harmovol}]$ by $[M_{harmosol}]+[M_{Harmovol}]-Id$, where:

Id is the Identity matrix, $[M_{harmosol}] = \begin{bmatrix} 1 & hz & -hy \\ -hz & 1 & hx \\ hy & -hx & 1 \end{bmatrix}$ and $[M_{harmovol}] = \begin{bmatrix} 1 & hzvol & -hyvol \\ -hzvol & 1 & hxvol \\ hyvol & -hxvol & 1 \end{bmatrix}$;

wherein hxvol, hyvol, hzvol are harmonization values determined based on a recursive algorithm, as a function of the magnetic field vector values acquired in flight, said recursive algorithm exploiting the fact that the vertical magnetic field components obtained after harmonization as a function of said approximation of $[M_{harmosol}]\cdot[M_{harmovol}]$ of the magnetic field vector values are equal to a constant.

5. A computer program for including software instructions which, when executed by a computer, carry out a method according to claim 1.

6. An electronic device for estimating harmonization values of a magnetometer installed in a mobile machine, said magnetometer being associated with its reference coordinate system XM, YM, ZM and the mobile machine being associated with its airplane coordinate system XA, YA, ZA, said device being configured to acquire a plurality of magnetic field vector values measured by the magnetometer corresponding to successive positions of the mobile machine according to varied successive headings of the mobile machine on ground, a non-horizontality of the ground being less than 2°;
  said device being configured to determine horizontal harmonization values hx, hy, where hx corresponds to the Euler angle associated with rotation around XA, and where hy corresponds to the Euler angle associated with rotation around YA to go from the reference coordinate system XM, YM, ZM of the magnetometer to the airplane coordinate system XA, YA, ZA, to estimate a first angle equal to an angle between XM and the large axis of an ellipse defined in the plane comprising the two axes XM, ZM by said acquired field vector values, to determine hy as being equal to said first estimated angle, to estimate a second angle equal to an angle between YM and the large axis of an ellipse defined in the plane comprising the two axes YM, ZM by said acquired field vector values and to determine hx as being equal to said second estimated angle, wherein
  the device for estimating harmonization values of a magnetometer installed in a mobile machine is configured to estimate an angle among the first or the second angle by:
  determining the coordinates of the center of the ellipse of the first or second angle by the half-sum, on the x-axis of the plane of the ellipse of the first or second angle, the minimum x-axis and the maximum x-axis among the acquired field vector values and by the half-sum, on the y-axis of the plane of the ellipse of the first or second angle, the minimum y-axis and the maximum y-axis among the acquired field vector values;
  determining, in the plane of the ellipse of the first or second angle, the point, among the acquired field vector values, at a maximum distance from the center of the ellipse of the first or second angle; and
  calculating the angle among the first or the second angle as a function of said determined coordinates of the center of the ellipse of the first or second angle and coordinates of said determined point at a maximum distance from the center.

7. The device for estimating harmonization values of a magnetometer installed in a mobile machine according to claim 6, configured to calculate a difference between a reference heading value and a heading value resulting from a correction as a function of the determined values of hx and hy, a measurement of the magnetic field done by the magnetometer corresponding to a position of the mobile machine according to a heading of the mobile machine, in order to deduce the vertical harmonization value hz as a function of the equality below, as a function of the calculated difference and as a function of the determined values of hx and hy:

$$hz=[\delta\Psi-hy\cdot(\cos\theta\sin\varphi+\tan(I)\cdot(-\sin\theta\sin\varphi\cos\psi+\cos\varphi\sin\psi))-hx\cdot(-\sin\theta-\tan(I)\cos\theta\cos\psi)]/(\cos\varphi\cos\theta-\tan(I)\cdot(\sin\theta\cos\varphi\cos\psi+\sin\varphi\sin\Psi)),$$

where:
- I is the incline of the Earth's magnetic field in said position,
- ψ, θ, φ are the attitude angles, respectively yaw, pitch and roll, of the mobile machine in said position, and
- δΨ represents heading calculation error due to harmonization defects.

8. The device for estimating harmonization values of a magnetometer installed in a mobile machine according to claim 7, wherein said equality yielding hz is approximated by one of the following formulas:

$$hz=\delta\Psi;$$

$$hz=\delta\Psi/(1-\tan(I)*\sin\theta);$$

$$hz=\delta\Psi/(\cos\varphi\cos\theta-\tan(I)\cdot(\sin\theta\cos\varphi\cos\psi+\sin\varphi\sin\Psi)).$$

* * * * *